United States Patent [19]

Hübner et al.

[11] Patent Number: 4,869,571
[45] Date of Patent: Sep. 26, 1989

[54] PLUG PIN FOR A LIGHT WAVEGUIDE

[75] Inventors: Horst Hübner, Nümbrecht; Ulrich Grzesik, Bergisch-Gladbach, both of Fed. Rep. of Germany

[73] Assignee: U.S. Philips Corp., Tarrytown, N.Y.

[21] Appl. No.: 211,643

[22] Filed: Jun. 27, 1988

[30] Foreign Application Priority Data

Jan. 7, 1987 [DE] Fed. Rep. of Germany ....... 3721650

[51] Int. Cl.⁴ ................................................. G02B 6/36
[52] U.S. Cl. .................................................. 350/96.20
[58] Field of Search ........................... 350/96.20, 96.21

[56] References Cited

U.S. PATENT DOCUMENTS

| | | | |
|---|---|---|---|
| 4,166,672 | 9/1979 | Gilbert | 350/96.20 |
| 4,261,642 | 4/1981 | Lewis et al. | 350/96.20 |
| 4,390,237 | 6/1983 | Marazzi | 350/96.20 |
| 4,691,986 | 9/1987 | Aberson, Jr. et al. | 350/96.20 X |
| 4,695,124 | 9/1987 | Himono et al. | 350/96.20 |
| 4,722,584 | 2/1988 | Kakii et al. | 350/96.20 |

Primary Examiner—William L. Sikes
Assistant Examiner—Akm E. Ullah
Attorney, Agent, or Firm—Ernestine C. Bartlett

[57] ABSTRACT

The invention relates to a plug pin for a light waveguide (LWG) which can be plugged in a pin bushing, comprising a core tube having a central aperture into which core the LWG can be inserted and which tube is enveloped by a sleeve made of a material which is softer than that of the core tube and which has a higher coefficient of thermal expansion. A plug connection which is low-loss in a large temperature range is obtained in that the wall thicknesses of the sleeve (3) and of the core tube (2) are proportioned so that the resulting coefficient of thermal expansion of the plug pin corresponds substantially to the value of the material of the pin bushing (4).

8 Claims, 1 Drawing Sheet

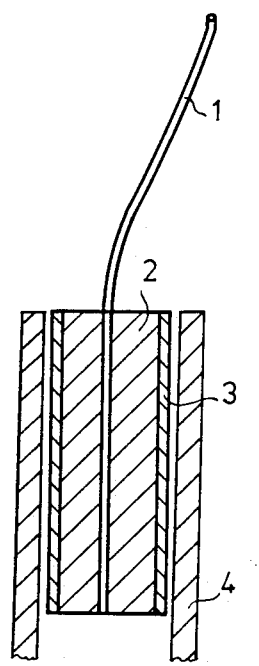

PLUG PIN FOR A LIGHT WAVEGUIDE

FIELD OF THE INVENTION

The invention relates to a plug pin for a light waveguide (LWG) which can be plugged in a pin bushing, comprising a core tube having a central aperture into which the LWG can be inserted and which tube is enveloped by a metal sleeve made of a material which is softer than that of the core tube and which has a higher coefficient of thermal expansion.

BACKGROUND OF THE INVENTION

In an arrangement of this type described in PKI Techmitt. 1987, SO. 1, p. 86, the core tubes in the form of glass capillaries are made comparatively thin, whereas the metal sleeves, which consist of a soft metal and can readily be worked, are very thick. When the plug pins are to be inserted into associated pin bushings consisting, for example, of a hard metal, and an easy motion is required also in a larger temperature range, comparatively large gaps must be made between the plug pin and the pin bushing to prevent at the highest temperatures clamping due to the plug pin expanding more considerably in the plug bushing. On the other hand, at low temperatures, gaps are formed that are too large and result in a misalignment of the LWG of the plug pin to the LWG of the plug bushing.

SUMMARY OF THE INVENTION

An object of the invention is to construct the plug pin for a light waveguide which can be plugged in a pin bushing wherein the bushing comprises a core tube having a central aperture into which the light waveguide can be inserted, and wherein the tube is enveloped by a metal sleeve made of a material that is softer than that of the core and that has a higher coefficient of thermal expansion. A further object is to construct such a plug pin in such a manner that a low-loss connection in a large temperature range is possible.

These and other object are achieved in that the wall thicknesses of the sleeve and of the core tube are proportioned so that the resulting coefficient of thermal expansion of the plug pin corresponds essentially to the value of the material of the pin bushing.

The sleeve need be provided only in such small wall thicknesses that in the centering process any required material removal, for example, by turning, is possible. Instead of the high coefficient of thermal expansion of the soft material of the sleeve, the low coefficient of expansion of the material of the core tube determines the expansion of the plug pin.

By adapting the material and the relative thicknesses of the core tube and the sleeve it can be achieved that the gap between plug pin and pin bushing is substantially independent of temperature.

Advantageously a material may be chosen for the sleeve which can readily be chipped. On the other hand, it should not be selected so as to be restrictive with respect to a coefficient of thermal expansion which is adapted to the pin bushing.

In a preferred method of manufacturing a plug pin according to the invention, the sleeve is manufactured so as to have an inside diameter which is smaller than the outside diameter of the core tube and, in the heated condition, can be slid over otherwise superimposed on the core tube. A firm flexible connection between core tube and sleeve always remains in the temperature range of, for example, from $-20°$ to $+60°$.

On the other hand, adhesives are also available which ensure such a connection without thermal shrinkage.

According to an alternative method, the sleeve is provided on the core tube in the molten condition as a layer of a soldering material. For this purpose silver solders are particularly suitable.

BRIEF DESCRIPTION OF THE INVENTION

The sole FIGURE is a longitudinal sectional view of a plug pin according to the invention.

DETAILED DESCRIPTION OF THE PREFERRED EMBODIMENTS

The plug pin shown in the FIGURE and receiving the end of an LWG consists of a core tube 2 and a thin sleeve 3. The LWG 1 was bonded in the central aperture of the core tube which consists, for example, of a ceramic material ($\alpha = 4.10^{-6}$). A sleeve of a readily workable soft metal ($\alpha = 16.10^{-6}$) which is available under the trade name Arcap (an alloy of substantially nickel, copper and zinc) was manufactured with an inside diameter of 2.223 mm. After heating at 300° C. the above was slid over the core tube. The outer circumference of the sleeve 3 of the plug pin fixed in an optical lathe centered to the optical axis of the LWG was subjected to a chipping process. The plug pin thus obtained proved to be particularly and readily suitable for a corresponding hard metal pin bushing (4) whose inside diameter is 2.50 mm and the material of which has a coefficient of thermal expansion of $\alpha = 5.3.10^{-6}$.

What is claimed is:

1. A plug pin for a light waveguide which can be plugged in a pin bushing, comprising a core tube having a central aperture into which the light waveguide can be inserted and which tube is enveloped by a sleeve made of a material which is softer than that of the core tube and has a higher coefficient of thermal expansion, wherein the wall thicknesses of the sleeve and of the core tube are proportioned so that the resulting coefficient of thermal expansion of the plug pin corresponds substantially to the value of the material of the pin bushing.

2. An arrangement as claimed in claim 1, wherein the wall thickness of the sleeve is smaller than that of the core tube.

3. An arrangement as claimed in claim 1 or 2, wherein the coefficient of thermal expansion of the material of the core tube is smaller than that of the material of the pin bushing.

4. A plug pin as claimed in claim 1, wherein the material of the sleeve can be subjected to a chipping process.

5. A method of manufacturing a plug pin comprising a core tube having a central aperture into which a light waveguide can be inserted, which tube is enveloped by a sleeve, comprising a step of manufacturing the sleeve to have an inside diameter which is smaller than the outside diameter of the core tube and superimposing the sleeve over the core tube in the heated condition.

6. A method as claimed in claim 5, wherein the core tube consists of a ceramic and a soft-metallic iron-free sleeve whose inside diameter is at least 0.003 mm smaller than the outside diameter of the core tube is slid over the core tube at a temperature of 250° to 350° C.

7. A method as claimed in claim 5, wherein the sleeve is bonded to the core tube.

8. A method as claimed in claim 5, wherein the sleeve is provided on the core tube in the molten condition as a layer of a soldering material.

* * * * *